Patented Jan. 15, 1952

2,582,670

UNITED STATES PATENT OFFICE 2,582,670

METHOD OF VULCANIZING RUBBER AND PRODUCTS THEREOF

David J. Beaver, St. Albans, W. Va., assignor to Monsanto Chemical Company, St. Louis, Mo., a corporation of Delaware No Drawing. Application January 17, 1949, Serial No. 71,390

18 Claims. (Cl. 260—798)

This invention relates to the vulcanization of rubber. More particularly it relates to the vulcanization of rubber with a new class of accelerators and to the vulcanized products resulting thereby.

In the compounding of rubber, both natural and synthetic, improvements have been constantly sought, particularly in respect to the more efficient and more economical use of vulcanization accelerators. While many accelerators, per se, produce vulcanizates having acceptable physical properties, it has long been known that by the incorporation into the compounded stock of accelerators such as dibutylammonium oleate and diphenyl guanidine phthalate in addition to other type accelerators, such as the thiazoles, greater ease in processing and a better vulcanizate is obtained. It has become customary to denote materials such as dibutyl ammonium oleate and diphenyl guanidine phthalate and the like as activators. Similarly, it is preferred to employ the new accelerators in conjunction with accelerators of other types as activators.

It is an object of this invention to provide a class of activators which are capable of assisting accelerators possessing inherent weaknesses, such as inefficient vulcanizing effect, limited solubility, and poor dispersibility in rubber stocks, thus causing uneven cures which in turn result in non-uniform properties and erratic performance in service. It is also an object of this invention to decrease the time of vulcanization. A further object is to provide a wider choice of curing conditions such that a series of combinations varying in scorch and curing properties may be obtained. For example, the ratio of activator to accelerator may vary depending upon the type of rubber, type of stock, temperature of cure, time of cure, the particular accelerator, and the objective of the compounder, i. e., whether a low or high modulus is desired or a short or long cure is required. Other objects will appear hereinafter.

It has been found in accordance with this invention that the above mentioned objects are substantially attained by vulcanizing a vulcanizable rubber stock in which has been incorporated a member of the group of compounds comprising amic acids, or half amides of dicarboxylic acids, and their salts of the following general formula

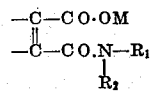

where M is hydrogen or a salt forming group such as a metal, ammonia, an amine, urea, and the like; where $R_1$ and $R_2$ are alkyl, aralkyl, and cycloalkyl groups such as methyl, ethyl, ethanol, 2-cyanoethyl, propyl, butyl, 2-cyanobutyl, amyl, benzyl, phenethyl, cyclohexyl, methyl cyclohexyl, and their various isomeric groups, carbamyl and hydrocarbon substituted carbamyl radicals, thiocarbamyl and hydrocarbon substituted thiocarbamyl radicals, and the like, and also either $R_1$ or $R_2$, but not both, may be hydrogen. The unsaturated group which links the two carbonyl carbon atoms may be part of an olefinic nucleus, as for example in maleamic acid and in dimethyl maleamic acid, or an aromatic nucleus, as for example in phthalamic acid and in naphthalamic acid, and their substituted analogues and homologues. Among the salt forming groups are the alkali- and alkaline-earth metals, zinc, magesium, and the like, ammonia, methyl amine, ethyl amine, isopropyl amine, butyl amine, benzyl amine, cyclohexyl amine, dimethyl amine, diethyl amine, dipropyl amine, dibutyl amine, methyl propyl amine, N-methyl cyclohexylamine, dicyclohexylamine, dibenzyl amine, piperidine, trimethyl amine, triethyl amine, and the like.

Although amic acids and their salts of the above described general formula produce good results, the best results are obtained with phthalamic and maleamic acids, their metal salts, and their alkyl and cycloalkyl substituted amine salts, wherein at least one hydrogen atom of the amido nitrogen is replaced by an alkyl or cycloalkyl group. As specific examples of this group are N,N-dibutyl maleamic acid, N-cyclohexyl maleamic acid, N,N-dicyclohexyl maleamic acid, N-ethyl phthalamic acid, N-butyl phthalamic acid, N,N-diisopropyl phthalamic acid, N,N-dibutyl phthalamic acid, N,N-dicyclohexyl phthalamic acid, zinc salt of N-butyl maleamic acid, zinc salt of N-ethyl phthalamic acid, zinc salt of N-butyl phthalamic acid, zinc salt of N,N-dicyclohexyl phthalamic acid, isopropyl amine salt of N-isopropyl maleamic acid, butyl amine salt of N-butyl maleamic acid, dicyclohexyl amine salt of N,N-dicyclohexyl maleamic acid, ethyl amine salt of N-ethyl phthalamic acid, isopropyl amine salt of N-isopropyl phthalamic acid, butyl amine salt of N-butyl phthalamic acid, dicyclohexyl amine salt of N,N-dicyclohexyl phthalamic acid.

As illustrative of the preparation of the new activators are the following examples but in nowise are they to be considered limitative thereof.

EXAMPLE 1

44.4 parts by weight (substantially 0.3 mol) of phthalic anhydride and 108.8 parts by weight (substantially 0.6 mol) of dicyclohexylamine were mixed in a suitable reaction vessel and heated on a steam bath. A thick yellow syrupy liquid formed which on cooling gave 152.7 parts by weight (about 100% yield) of a yellow crystalline solid believed to be the dicyclohexyl amine salt of N,N-dicyclohexyl phthalamic acid,

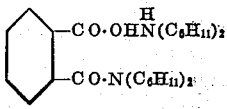

having a melting point of 172°–174° C.

EXAMPLE 2

90.1 parts by weight (substantially 2.0 mols) of ethyl amine was distilled into a suitable reaction vessel containing 148 parts by weight (substantially 1.0 mol) of phthalic anhydride immersed in a steam bath. A straw colored liquid developed which on separating and drying solidified to give 225 parts by weight (about 95% yield) of a crystalline product believed to be the ethyl amine salt of N-ethyl phthalamic acid,

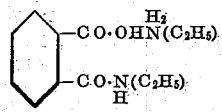

having a nitrogen content of about 11.8% (theoretical nitrogen 11.7%) and a decomposition temperature of about 128° C.

EXAMPLE 3

148 parts by weight (substantially 1.0 mol) of phthalic anhydride and 181.2 parts by weight (substantially 1.0 mol) of dicyclohexyl amine were mixed in a suitable container and heated on a steam bath. A yellow syrup developed which on cooling solidified. The yellow solid was dissolved in 100 parts by weight of a 25% sodium hydroxide solution and thereto was added dilute hydrochloric acid precipitating N,N-dicyclohexyl phthalamic acid,

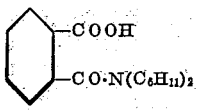

which upon washing and drying was observed as having a melting point of 189° C. Analysis for nitrogen gave approximately 4.4% (theoretical nitrogen 4.3%).

EXAMPLE 4

100 parts by weight (substantially 0.3 mol) of the above prepared N,N-dicyclohexyl phthalamic acid was heated on a steam bath with 800 parts by weight of a 25% potassium hydroxide solution. A yellow oily layer developed and was separated. To this yellow oily material was added 40 parts by weight (substantially 0.3 mol) of zinc chloride. A white gelatinous precipitate formed which was believed to be the zinc salt of N,N-dicyclohexyl phthalamic acid,

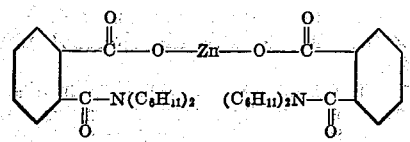

EXAMPLE 5

44.4 parts by weight (substantially 0.3 mol) of phthalic anhydride and 43.8 parts by weight (substantially 0.6 mol) of butyl amine were placed in a suitable reaction vessel equipped with an agitator and a reflux condenser and heated over a steam bath for 15 minutes. A clear yellow liquid developed which on cooling gave 87 parts by weight of a white crystalline product having a melting point range of 95°–110° C., believed to be the butyl amine salt of N-butyl phthalamic acid.

EXAMPLE 6

To a suitable reaction vessel equipped with an agitator containing 24.6 parts by weight (substantially 0.25 mol) of maleic anhydride was added 36.6 parts by weight (substantially 0.5 mol) of butyl amine over a period of thirty minutes at a temperature below 15° C. Upon completion of the amine addition the temperature was raised to 110° C. A pale yellow syrup developed which on cooling gave 61 parts by weight of a gelatinous light yellow colored liquid believed to be the butyl amine salt of N-butyl maleamic acid.

EXAMPLE 7

A mixture containing 148.1 parts by weight (substantially 1 mol) of phthalic anhydride and 76.2 parts by weight (substantially 1 mol) of thiourea was heated in a suitable reaction vessel at a temperature of 140°–160° C. 218.8 parts by weight of a yellow pasty material developed believed to be crude thiophthaluric acid. This product was taken up with water and the solution made alkaline and filtered. Thereupon the filtrate was made acid with dilute hydrochloric acid and filtered. The pale yellow residue was dried and found to have a melting point of 180°–186° C. and a nitrogen content of 12.52% as compared to a theoretical nitrogen content of 12.50%.

As exemplary of the activating properties of the amic acids the following gum stocks were compounded comprising

|  | A | B | C | D |
|---|---|---|---|---|
|  | Parts by weight | Parts by weight | Parts by weight | Parts by weight |
| Pale crepe rubber | 100. | 100. | 100. | 100. |
| Zinc oxide | 35. | 35. | 35. | 35. |
| Sulfur | 1.3 | 1.3 | 1.3 | 1.3 |
| Stearic acid | 1.0 | 1.0 | 1.0 | 1.0 |
| Benzothiazyl disulfide | 0.6 | 0.6 | 0.6 | 0.6 |
| Dicyclohexyl amine salt of N,N-dicyclohexyl phthalamic acid of Example 1 | 1.0 | | | |
| N,N-dicyclohexyl phthalamic acid of Example 3 | | 1.0 | | |
| Zinc salt of N,N-dicyclohexyl phthalamic acid of Example 4 | | | 1.0 | |

The above stocks so compounded were vulcanized in the usual manner by heating in a press for different periods of time at 155° C. The physical properties of the respective cured rubber products are set forth below:

Table I

| Stock | Min. cure at 155° C. | A | B | C | D |
|---|---|---|---|---|---|
| 300% modulus p. s. i. | 10 | 209 | 205 | 230 | no cure. |
|  | 20 | 212 | 212 | 225 | 175. |
| 500% modulus p. s. i. | 10 | 598 | 667 | 802 | no cure. |
|  | 20 | 515 | 640 | 670 | 530. |
| 700% modulus, p. s. i. | 10 | 2,425 | 2,397 | 2,767 | no cure. |
|  | 20 | 2,030 | 2,357 | 2,457 | 1,885. |
| Ultimate tensile, p. s. i. | 10 | 3,517 | 3,057 | 3,270 | no cure. |
|  | 20 | 3,030 | 3,317 | 2,892 | 2,540. |
| Ultimate elongation, percent | 10 | 790 | 765 | 735 | no cure. |
|  | 20 | 800 | 782 | 732 | 765. |

It is obvious from the above data that the amic acids and their amine and metal salts have appreciably accelerated the rate of cure of a natural rubber stock.

As further exemplary of this invention the following gum stocks were compounded comprising:

|  | E | F | G | H | I | K | L |
|---|---|---|---|---|---|---|---|
|  | Parts by weight | Parts by weight | Parts by weight | Parts by weight | Parts by weight | Parts by weight | Parts by weight |
| Smoked sheets rubber | 100. | 100. | 100. | 100. | 100. | 100. | 100. |
| Zinc oxide | 35. | 35. | 35. | 35. | 35. | 35. | 35. |
| Sulfur | 1.3 | 1.3 | 1.3 | 1.3 | 1.3 | 1.3 | 1.3 |
| Stearic acid | 1.0 | 1.0 | 1.0 | 1.0 | 1.0 | 1.0 | 1.0 |
| Benzothiazyl disulfide | 0.6 | 0.6 | 0.6 | 0.6 | 0.6 | 0.6 | 0.6 |
| Ethyl amine salt of N-ethyl phthalamic acid of Example 2 | 1.0 |  |  |  |  |  |  |
| Butyl amine salt of N-butyl phthamic acid of Example 5 |  | 0.8 | 0.4 |  |  |  |  |
| Butyl amine salt of N-butyl maleamic acid of Example 6 |  |  |  | 1.0 | 0.5 |  |  |
| Thio phthaluric acid of Example 7 |  |  |  |  |  | 1.0 |  |

The above stocks so compounded were vulcanized in the usual manner by heating in a press for various periods of time at 142° C. The physical properties of the respective cured products are set forth below:

Table II

| Stocks | Min. cure at 142° C. | E | F | G | H | I | K | L |
|---|---|---|---|---|---|---|---|---|
| 300% modulus p. s. i | 10 | 281 | 192 | 80 | 148 | 135 | 120 | no cure. |
|  | 20 | 325 | 220 | 193 | 190 | 150 | 160 | no cure. |
| 500% modulus, p. s. i | 10 | 884 | 845 | 470 | 798 | 630 | 478 | no cure. |
|  | 20 | 1,038 | 905 | 773 | 848 | 773 | 686 | no cure. |
| 700% modulus, p. s. i | 10 | 3,307 | 3,222 | 1,835 | 2,908 | 2,303 | 1,515 | no cure. |
|  | 20 | 3,595 | 3,567 | 3,193 | 3,013 | 2,850 | 2,205 | 358. |
| Ultimate tensile, p. s. i | 10 | 3,980 | 3,612 | 2,793 | 4,023 | 3,240 | 2,120 | no cure. |
|  | 20 | 3,891 | 3,803 | 3,455 | 3,993 | 3,340 | 2,623 | 491. |
| Ultimate elongation, percent | 10 | 763 | 750 | 793 | 783 | 778 | 785 | no cure. |
|  | 20 | 750 | 735 | 725 | 783 | 740 | 753 | 763. |

The data set forth in the above table show that the amic acid salts are a class of compounds which exert a marked activating effect on the cure rate and produce vulcanizates of high tensile strength in a short time. These new activators are readily compatible in rubber stocks, both natural and synthetic, and are non-toxic.

As exemplary of the activating properties of the amic acids in a synthetic rubber stock the following were compounded comprising

|  | M | N | O |
|---|---|---|---|
|  | Parts by weight | Parts by weight | Parts by weight |
| GR-S rubber | 100. | 100. | 100. |
| Carbon black | 40. | 40. | 40. |
| Zinc oxide | 3. | 3. | 3. |
| Sulfur | 2. | 2. | 2. |
| Mercaptobenzothiazole | 1. | 1. | 1. |
| Hydrocarbon oil plasticizer | 8. | 8. | 8. |
| Dicyclohexylamine salt of N,N-dicyclohexyl phthalamic acid of Example 1 | 1.0 |  |  |
| Ethyl amine salt of N-ethyl phthalamic acid of Example 2 |  | 1.0 |  |

The above stocks so compounded were vulcanized in the usual manner by heating in a press for different periods of time at 142° C. The physical properties of the respective cured rubber products are set forth below:

Table III

| Stock | Min. cure at 142° C. | M | N | O |
|---|---|---|---|---|
| 300% Modulus, p. s. i | 20 | 1,066 | 535 | 77 |
|  | 40 | 1,338 | 977 | 225 |
| Ultimate elongation, per cent | 20 | 550 | 817 | 1,200 |
|  | 40 | 420 | 550 | 980 |
| Ultimate tensile, p. s. i | 20 | 2,283 | 2,033 | 186 |
|  | 40 | 2,076 | 2,432 | 901 |

Obviously the amount of the new activators employed will vary outside the range of the specific examples. For example as little as 0.2% on the rubber was found to exert an activating effect. Amounts higher than those specifically shown, as for example 2%, can be employed depending upon the conditions of compounding and the objectives of the compounder.

The amic acids and their salts of themselves possess vulcanization accelerator properties. For example, the following natural rubber stocks were compounded comprising

|  | P | Q |
|---|---|---|
|  | Parts by weight | Parts by weight |
| Smoked sheets rubber | 100 | 100 |
| Zinc oxide | 5 | 5 |
| Sulfur | 3 | 3 |
| Stearic acid | 1 | 1 |
| Ethyl amine salt of N-ethyl phthalamic acid of Example 2 | 1.5 |  |
| Dicyclohexylamine salt of N,N-dicyclohexyl phthalamic acid of Example 1 |  | 1.5 |

The above stocks so compounded were vulcanized in the usual manner by heating in a press for 60 and 90 minutes respectively at 142° C. and the following results were obtained on testing the cured rubber products.

Table IV

| Stock | Minutes Cure at 142° C. | Modulus of Elasticity in lbs./in.$^2$ at elongations of— | | Ultimate Tensile in lbs./in.$^2$ | Ultimate Elongation, Percent |
|---|---|---|---|---|---|
|  |  | 500% | 700% |  |  |
| P | 60 | 543 | 2,225 | 2,738 | 745 |
|  | 90 | 547 | 2,037 | 2,037 | 700 |
| Q | 60 | 433 | 1,805 | 2,475 | 780 |
|  | 90 | 527 | 2,290 | 3,070 | 750 |

By the term rubber as employed in the appended claims is meant natural as well as synthetic rubbers which are capable of vulcanization when heated with sulfur and includes latices and reclaims of such materials whether or not admixed with pigments, fillers, softeners, antioxidants, etc.

As exemplary of the activatable organic accelerators or primary accelerators are the mercaptothiazoles, mercaptoarylene thiazoles, thiuram mono and disulfides, the dithiocarbamates and their esters, the xanthates and other accelerators of different type than the amic acids.

While specific embodiments of the invention have been described herein, it will be understood that the invention is not so limited but various modifications may be made therein without departing from the spirit of the invention or scope of the appended claims.

What is claimed is:

1. The method of vulcanizing rubber which comprises heating a rubber and sulfur in the presence of a compound selected from the group consisting of acids of the structure

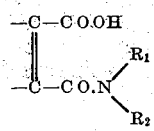

and salts thereof, where $R_1$ is selected from a group consisting of hydrogen, alkyl radicals of one to five carbon atoms inclusive and their monohydroxy and monocyano substituted derivatives, benzyl, phenethyl, cyclohexyl and methylcyclohexyl radicals, $R_2$ is selected from a group consisting of alkyl radicals of one to five carbon atoms inclusive and their monohydroxy and monocyano substituted derivatives, benzyl, phenethyl, cyclohexyl and methylcyclohexyl radicals.

2. The method of vulcanizing rubber which comprises heating a rubber and sulfur in the presence of an amine salt of an amic acid selected from the group consisting of phthalamic and maleamic acids, wherein there is attached to each nitrogen atom of the amic acid amine salt a radical selected from the group consisting of alkyl radicals of one to five carbon atoms inclusive and there monohydroxy and monocyano substituted derivatives, benzyl, phenethyl, cyclohexyl and methylcyclohexyl radicals.

3. The method of vulcanizing rubber which comprises heating a rubber and sulfur in the presence of an amine salt of an amic acid selected from the group consisting of phthalamic and maleamic acids wherein there is attached to each nitrogen atom of the said amine salt an alkyl radical of one to five carbon atoms inclusive.

4. The method of vulcanizing rubber which comprises heating a rubber and sulfur in the presence of an amine salt of phthalamic acid wherein there is attached to each nitrogen atom of the said amine salt an alkyl radical of one to five carbon atoms inclusive.

5. The method of vulcanizing rubber which comprises heating a rubber and sulfur in the presence of a metal salt of an amic acid selected from the group consisting of phthalamic and maleamic acids wherein there is attached to the amido nitrogen atom a radical selected from the group consisting of alkyl radicals of one to five carbon atoms inclusive and their monohydroxy and monocyano substituted derivatives, benzyl, phenethyl, cyclohexyl and methylcyclohexyl radicals.

6. The method of vulcanizing rubber which comprises heating a rubber and sulfur in the presence of a thiazole accelerator and an amine salt of an amic acid selected from the group consisting of phthalamic and maleamic acids wherein there is attached to each nitrogen atom of the said amine salt an alkyl radical of one to five carbon atoms inclusive.

7. The method of vulcanizing rubber which comprises heating a rubber and sulfur in the presence of the butyl amine salt of N-butyl phthalamic acid.

8. The method of vulcanizing rubber which comprises heating a rubber and sulfur in the presence of the dicyclohexylamine salt of N,N-dicyclohexyl phthalamic acid.

9. The method of vulcanizing rubber which comprises heating a rubber and sulfur in the presence of the ethyl amine salt of N-ethyl phthalamic acid.

10. The vulcanized rubber product obtained by heating a rubber and sulfur in the presence of a compound selected from the group consisting of acids of the structure

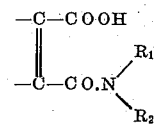

and salts thereof, where $R_1$ is selected from a group consisting of hydrogen, alkyl radicals of one to five carbon atoms inclusive and their monohydroxy and monocyano substituted derivatives, benzyl, phenethyl, cyclohexyl and methylcyclohexyl radicals, $R_2$ is selected from a group consisting of alkyl radicals of one to five carbon atoms inclusive and their monohydroxy and monocyano substituted derivatives, benzyl, phenethyl, cyclohexyl and methylcyclohexyl radicals.

11. The vulcanized rubber product obtained by heating a rubber and sulfur in the presence of an amine salt of an amic acid selected from the group consisting of phthalamic and maleamic acids, wherein there is attached to each nitrogen atom of the amic acid amine salt a radical selected from the group consisting of alkyl radicals of one to five carbon atoms inclusive and their monohydroxy and monocyano substituted derivatives, benzyl, phenethyl, cyclohexyl and methylcyclohexyl radicals.

12. The vulcanized rubber product obtained by heating a rubber and sulfur in the presence of an amine salt of an amic acid selected from the group consisting of phthalamic and maleamic acids wherein there is attached to each nitrogen atom of the said amine salt an alkyl radical of one to five carbon atoms inclusive.

13. The vulcanized rubber product obtained by heating a rubber and sulfur in the presence of an amine salt of phthalamic acid wherein there is attached to each nitrogen atom of the said amine salt an alkyl radical of one to five carbon atoms.

14. The vulcanized rubber product obtained by heating a rubber and sulfur in the presence of a metal salt of an amic acid selected from the group consisting of phthalamic and maleamic acids wherein there is attached to the amido nitrogen atom a radical selected from the group consisting of alkyl radicals of one to five carbon atoms inclusive and their monohydroxy and monocyano substituted derivatives, benzyl, phenethyl, cyclohexyl and methylcyclohexyl radicals.

15. The vulcanized rubber product obtained by heating a rubber and sulfur in the presence of a thiazole accelerator and an amine salt of an amic acid selected from the group consisting of phthalamic and maleamic acids wherein there is attached to each nitrogen atom of the said amine salt an alkyl radical of one to five carbon atoms inclusive.

16. The vulcanized rubber product obtained by heating rubber and sulfur in the presence of the butyl amine salt of N-butyl phthalamic acid.

17. The vulcanized rubber product obtained by heating rubber and sulfur in the presence of the dicyclohexylamine salt of N,N-dicyclohexyl phthalamic acid.

18. The vulcanized rubber product obtained by heating rubber and sulfur in the presence of the ethyl amine salt of N-ethyl phthalamic acid.

DAVID J. BEAVER.

REFERENCES CITED

The following references are of record in the file of this patent:

UNITED STATES PATENTS

| Number | Name | Date |
| --- | --- | --- |
| 2,011,219 | Harman | Aug. 13, 1935 |
| 2,072,770 | Reid | Mar. 2, 1937 |
| 2,101,323 | Salzberg | Dec. 7, 1937 |
| 2,103,749 | Horst | Dec. 28, 1937 |
| 2,360,990 | Valkenburgh | Oct. 24, 1944 |